(12) United States Patent
Fong et al.

(10) Patent No.: US 6,426,383 B1
(45) Date of Patent: Jul. 30, 2002

(54) PREPARATION OF WATER SOLUBLE POLYMER DISPERSIONS FROM VINYLAMIDE MONOMERS

(75) Inventors: Dodd W. Fong, Naperville; Manian Ramesh, Lisle; Anthony G. Sommese, Aurora, all of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 08/864,308

(22) Filed: May 28, 1997

(51) Int. Cl.[7] .................................................. C08L 9/04
(52) U.S. Cl. ........................................ 524/827; 524/812
(58) Field of Search .................. 524/827, 812

(56) References Cited

U.S. PATENT DOCUMENTS

| | | | |
|---|---|---|---|
| 4,151,202 A | | 4/1979 | Hunter et al. |
| 4,880,497 A | * | 11/1989 | Pfohl et al. |
| 4,921,621 A | | 5/1990 | Costello et al. |
| 4,929,655 A | * | 5/1990 | Takeda ........................ 524/458 |
| 4,952,656 A | * | 8/1990 | Lai et al. |
| 5,006,590 A | | 4/1991 | Takeda et al. |
| 5,037,927 A | | 8/1991 | Itagaki et al. |
| 5,126,395 A | | 6/1992 | End et al. |
| 5,155,167 A | * | 10/1992 | Pinschmidt, Jr. et al. |
| 5,194,492 A | * | 3/1993 | Pinschmidt, Jr. et al. |
| 5,300,566 A | * | 4/1994 | Pinschmidt, Jr. et al. |
| 5,326,809 A | * | 7/1994 | Bott et al. |
| 5,330,650 A | | 7/1994 | Byrne et al. |
| 5,332,507 A | * | 7/1994 | Braden et al. |
| 5,338,815 A | | 8/1994 | Aizawa et al. |
| 5,380,403 A | * | 1/1995 | Robeson et al. |
| 5,380,782 A | * | 1/1995 | Bogan, Jr. .................. 524/404 |
| 5,397,436 A | * | 3/1995 | Robeson et al. |
| 5,435,922 A | | 7/1995 | Ramesh et al. |
| 5,441,649 A | * | 8/1995 | Sommese et al. |
| 5,476,594 A | * | 12/1995 | Collins et al. |
| 5,529,588 A | | 6/1996 | Sommese et al. |
| 5,571,860 A | * | 11/1996 | Kukkala et al. |
| 5,573,675 A | | 11/1996 | Sommese et al. |
| 5,605,970 A | | 2/1997 | Selvarajan |
| 5,622,533 A | * | 4/1997 | Sommese et al. |
| 5,656,562 A | * | 8/1997 | Wu ............................ 264/122 |
| 5,753,753 A | * | 5/1998 | Phung et al. |
| 5,910,531 A | * | 6/1999 | Freeman ..................... 524/556 |
| 5,936,042 A | | 8/1999 | Matsushima et al. .... 525/328.2 |
| 5,962,570 A | | 10/1999 | Sato et al. .................. 524/457 |

FOREIGN PATENT DOCUMENTS

| | | | |
|---|---|---|---|
| JP | 8188699 | | 7/1996 |
| WO | WO 95/11269 | * | 4/1995 |

* cited by examiner

Primary Examiner—Peter D. Mulcahy
(74) Attorney, Agent, or Firm—Michael B. Martin; Thomas M. Breininger

(57) ABSTRACT

The present invention relates to a novel process for the production of a water soluble polymer dispersion from vinylamide monomers, and, more particularly, polymers formed from N-vinylformamide monomers.

7 Claims, No Drawings

PREPARATION OF WATER SOLUBLE POLYMER DISPERSIONS FROM VINYLAMIDE MONOMERS

FIELD OF THE INVENTION

The present invention relates to a novel process for the production of a water soluble polymer dispersion from vinylamide monomers, and, more particularly, polymers formed from N-vinylformamide monomers.

BACKGROUND OF THE INVENTION

One of the problems that has confronted industry in the use of water soluble polymer flocculants is how to dissolve the polymer into water so that it can be utilized for its intended purpose. Early water soluble polymers were provided as dilute aqueous solutions. As the technology improved, and the molecular weights of the polymers were improved, it became increasingly difficult for manufacturers to ship these polymers in solution form because of the high viscosity of even one-half to one percent solutions of the polymers. Manufacturers accordingly started shipping the polymers in the form of commutated solids which could be dissolved into water using various mechanical means. While solving shipment problems, some mechanical means degraded the polymers through shear, and, incomplete dissolution of water soluble polymers, the formation of swollen translucent particles, was common, This led to a waste of polymer, and in some cases, detrimental results such as in the case of so called "fish-eye" particles which caused defects in the manufacture of paper. In the early 1970's water-in-oil emulsions of water soluble polymers were introduced. Using the water-in-oil technology, high molecular weight polymers that rapidly dissolved could be produced, and this technology achieved great acceptance in the water soluble polymer industry. A disadvantage of the water-in-oil emulsion polymer technology however is that the emulsions contain substantial quantities of hydrocarbon liquid. The introduction of hydrocarbon liquids into the systems where these water soluble polymers are used is not always beneficial.

U.S. Pat. Nos. 4,929,655 and 5,006,590 issued to Kyoritsu Yuki Co. Ltd. describe and claim a method for the production of dispersions of water soluble cationic polymers. These polymers were manufactured in an aqueous salt or brine solution in which the polymer was insoluble. The disclosure of these two patents is hereinafter incorporated by reference into this specification. The process yielded dispersions of high molecular weight polymers which when added to water would completely dissolve over a relatively short period of time. While an advance to the art, the invention was practical only for preparing water soluble polymer dispersions containing a hydrophobically modified cationic monomer. Of course, anionic polymers which include such functionality cannot be prepared without detracting from the performance of the resultant polymer which is based on the anionic character of the polymer.

U.S. Pat. No. 5,605,970 (hereby incorporated by reference), discloses and claims a method for the manufacture of a particular anionic water soluble polymer in dispersion form. This disclosure teaches that certain anionic polymers, incorporating hydrophobically modified monomers, can be prepared using dispersion polymer methods. The application specifically teaches the manufacture of acrylic acid-ethylhexylacrylate polymers. The ethylhexylacrylate monomer adds a hydrophobic character to the polymer, causing the polymer to become insoluble in certain brine solutions. While these polymers, and the methods for their manufacture are useful, the incorporation of a hydrophobic monomer into a water soluble polymer, where water solubility is desirable is not always advantageous in the final use of the polymer.

In the process of dispersion polymerization, the monomer and the initiator are both soluble in the polymerization medium, but the medium is a poor solvent for the resulting polymer. Accordingly, the reaction mixture is homogeneous at the onset, and the polymerization is initiated in a homogeneous solution. Depending on the solvency of the medium for the resulting oligomers or macroradicals and macromolecules, phase separation occurs at an early stage. This leads to nucleation and the formation of primary particles called "precursors" and the precursors are colloidally stabilized by adsorption of stabilizers. The particles are believed to be swollen by the polymerization medium and/or the monomer, leading to the formation of particles having a size in the region of ~0.1–10.0 microns.

In any dispersion polymerization, the variables that are usually controlled are the concentrations of the stabilizer, the monomer and the initiator, solvency of the dispersion medium, and the reaction temperature. It has been found that these variables can have a significant effect on the particle size, the molecular weight of the final polymer particles, and the kinetics of the polymerization process.

Particles produced by dispersion polymerization in the absence of any stabilizer are not sufficiently stable and may coagulate after their formation. Addition of a small percentage of a suitable stabilizer to the polymerization mixture produces stable dispersion particles. Particle stabilization in dispersion polymerization is usually referred to as "steric stabilization". Good stabilizers for dispersion polymerization are polymer or oligomer compounds with low solubility in the polymerization medium and moderate affinity for the polymer particles.

As the stabilizer concentration is increased, the particle size decreases, which implies that the number of nuclei formed increases with increasing stabilizer concentration. The coagulation nucleation theory very well accounts for the observed dependence of the particle size on stabilizer concentration, since the greater the concentration of the stabilizer adsorbed the slower will be the coagulation step. This results in more precursors becoming mature particles, thus reducing the size of particles produced.

Dispersion polymers have utility as additives in various water treatment applications as taught by U.S. Pat. Nos. 5,330,650, 5,332,507 and 5,435,922 for example. Furthermore, Japanese Unexamined Patent Publication No. 8-188699 describes an aqueous dispersion composition of a cationic polymer comprising amine or amidine, inorganic salt, nonionic or cationic surface active agent and water. Copolymers formed from the polymerization of various monomers with vinylamine have been described as additives for various water treatment applications such deinking process waters in U.S. Pat. No. 5,573,675, dewatering coal tailings in U.S. Pat. No. 5,529,588, color removal for pulp and paper applications in U.S. Pat. No. 5,476,594, and coal refuse thickening in U.S. Pat. No. 5,441,649.

The polymers described herein will be equally as effective in similar applications.

SUMMARY OF THE INVENTION

The present invention relates to a novel process for the production of a water soluble polymer dispersion from vinylamide monomers, and, more particularly, polymers formed from N-vinylformamide monomers.

DESCRIPTION OF THE INVENTION

One aspect of this invention is an aqueous dispersion comprising discrete particles of a water-soluble, non-ionic poly(N-vinylamide) polymer formed by the polymerization of an N-vinylamide monomer of the following formula:

$$H_2C=CR^2NRC(O)R^1$$

wherein R, $R^1$ and $R^2$ are each selected from the group consisting of hydrogen, $C_1$–$C_{20}$ alkyl groups, aryl groups and alkylaryl groups. Furthermore, said N-vinylamide monomer may be selected from the group consisting of N-vinyl formamide, N-methyl-N-vinylacetamide and N-vinyl acetamide.

Another aspect of the invention is a water-soluble non-ionic dispersion comprising:

discrete particles of a water-soluble, non-ionic poly(N-vinylamide) polymer formed by the polymerization of a vinylamide monomer of the formula $$H_2C=CR^2NRC(O)R^1$$

wherein R, $R^1$ and $R^2$ are each selected from the group consisting of hydrogen, $C_1$–$C_{20}$ alkyl groups, aryl groups and alkylaryl groups dispersed in an aqueous salt solution, wherein said salt in the salt solution is selected from the group consisting of ammonium, alkali metal and alkaline earth metal halides, sulfates, phosphates, nitrates and combinations thereof.

The invention is also a water-soluble non-ionic dispersion comprising:

discrete particles of a water-soluble poly(N-vinylformamide) polymer dispersed in an aqueous salt solution, wherein said salt in the salt solution is selected from the group consisting of ammonium, alkali metal and alkaline earth metal halides, sulfates, phosphates, nitrates and combinations thereof.

The invention is also a water-soluble non-ionic dispersion comprising:

discrete particles of a water-soluble poly(N-vinylacetamide) polymer dispersed in an aqueous salt solution, wherein said salt in the salt solution is selected from the group consisting of ammonium, alkali metal and alkaline earth metal halides, sulfates, phosphates, nitrates and combinations thereof.

Another aspect of the invention is a dispersion comprising:

discrete particles of a water-soluble, non-ionic poly(N-vinylamide) polymer formed by the polymerization of a vinylamide monomer of the formula $$H_2C=CR^2NRC(O)R^1$$

wherein R, $R^1$ and $R^2$ are each selected from the group consisting of hydrogen, $C_1$–$C_{20}$ alkyl groups, aryl groups and alkylaryl groups dispersed in an aqueous salt solution, containing a poly(vinyl alcohol) stabilizer polymer.

The salt in said salt solution in any of the aspects of this invention may be selected from the group consisting of ammonium, alkali metal and alkaline earth metal halides, sulfates, phosphates, nitrates and combinations thereof.

Another aspect of this invention is a dispersion comprising:

discrete particles of a water-soluble non-ionic poly(N-vinylformamide) polymer dispersed in an aqueous salt solution, containing a poly(vinyl alcohol) stabilizer polymer.

Moreover the invention is also a dispersion comprising:

discrete particles of a water-soluble non-ionic poly(N-vinylacetamide) polymer dispersed in an aqueous salt solution containing a poly(vinyl alcohol) stabilizer polymer.

The invention is also an aqueous dispersion of discrete particles of a water-soluble vinyl addition polymer containing an effective stabilizing amount of poly(vinyl alcohol) having a molecular weight of 1,000 to 5,000,000.

Yet another aspect of this invention is an aqueous dispersion of discrete particles of a water soluble polymer comprising:

a) from about 5 to about 50 weight percent of a water soluble polymer having been prepared by polymerizing under free radical forming conditions at a pH value of from about 5 to about 8, an N-vinyl formamide monomer;

b) from about 0.1 to about 5 weight percent based on the total weight of the dispersion of a water soluble stabilizer polymer having an intrinsic viscosity in 1M $NaNO_3$ of from about 0.1–10 dl/g;

c) from about 5 to about 40 weight percent based on the weight of the dispersion of a water soluble salt selected from the group consisting of ammonium, alkali metal and alkaline earth metal halides, sulfates, phosphates, nitrates and combinations thereof; and d) water, said dispersion being characterized as having a bulk Brookfield viscosity of from about 10 to about 25,000 cps at 25° C.

In any of the aspects of this invention, the stabilizer polymer may be selected from the group consisting of poly(vinyl alcohol), partially hydrolyzed poly(vinyl acetate), hydrolyzed poly(vinyl acetate/N-vinyl formamide), poly(vinyl alcohol/acrylamide), poly(diallyldimethyl ammonium chloride), poly(dimethylaminoethyl acrylate methyl chloride quaternary salt), poly(dimethylaminoethyl methacrylate methyl chloride quaternary salt), poly (dimethylaminoethyl acrylate benzyl chloride quaternary salt), poly(dimethylaminoethyl methacrylate benzyl chloride quaternary salt), poly(diallyldimethyl ammonium chloride/dimethyaminoethyl acrylate methyl chloride quaternary salt), poly(diallyldimethylammonium chloride/dimethylaminoethyl methacrylate methyl chloride quaternary salt), poly(diallyldimethylammonium chloride/dimethylaminoethyl acrylate benzyl chloride quaternary salt), and poly(diallyldimethyl ammonium chloride/dimethylaminoethyl methacrylate benzyl chloride quaternary salt) and combinations thereof.

The invention is also a dispersion of discrete particles of a water-soluble copolymer comprising:

a copolymer formed by polymerization of a vinylamide monomer of the formula $$H_2C=CR^2NRC(O)R^1$$

wherein R, $R^1$ and $R^2$ are each selected from the group consisting of hydrogen, $C_1$–$C_{20}$ alkyl groups, aryl groups and alkylaryl groups; with at least one monomer selected from the group consisting of vinyl acetate, diallyldimethyl ammonium chloride, vinyl pyrrolidinone, acrylonitrile, dimethylaminoethyl acrylate methyl chloride quaternary salt, dimethylaminoethyl acrylate benzyl chloride quaternary salt, dimethylaminoethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, and combinations thereof; said copolymer dispersed in an aqueous salt solution.

Moreover, another aspect of this invention is an aqueous dispersion of discrete particles of a water soluble polymer comprising:

a) from about 5 to about 50 weight percent of a water soluble copolymer having been prepared by polymerizing at a pH of from about 5 to about 8:
  i. 1–99 mole percent of a vinylamide monomer of the formula

wherein R, $R^1$ and $R^2$ are each selected from the group consisting of hydrogen, $C_1$–$C_{20}$ alkyl groups, aryl groups and alkylaryl groups; and,
  ii. 99–1 mole percent of at least one monomer selected from the group consisting of vinyl acetate, diallyldimethyl ammonium chloride, vinyl pyrrolidinone, acrylonitrile, dimethylaminoethyl acrylate methyl chloride quaternary salt, dimethylaminoethyl acrylate benzyl chloride quaternary salt, dimethylaminoethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, and combinations thereof; said copolymer dispersed in an aqueous salt solution.

b) from about 0.1 to about 5 weight percent based on the total weight of the dispersion of a water soluble stabilizer polymer having an intrinsic viscosity in 1M $NaNO_3$ of from about 0.1–10 dl/g;

c) from about 5 to about 40 weight percent based on the weight of the dispersion of a water soluble salt selected from the group consisting of ammonium, alkali metal and alkaline earth metal halides, sulfates, phosphates, nitrates and combinations thereof; and d) water, said dispersion being characterized as having a bulk Brookfield viscosity of from about 10 to about 25,000 cps at 25 degrees C.

A further aspect of this invention is an aqueous dispersion of discrete particles of a water-soluble copolymer comprising:

a copolymer formed by polymerization of a vinylamide monomer of the formula

wherein R, $R^1$ and $R^2$ are each selected from the group consisting of hydrogen, $C_1$–$C_{10}$ alkyl groups, aryl groups and alkylaryl groups;

with at least one monomer selected from the group consisting of acrylic acid and salts thereof, methacrylamide and salts thereof, $C_1$–$C_{10}$ N-alkyl acrylamide, $C_1$–$C_{10}$ N,N-dialkyl acrylamide, $C_1$–$C_{10}$ N-alkyl methacrylamide, $C_1$–$C_{10}$ N,N-dialkyl methacrylamide, N-aryl acrylamide, N,-N-diaryl acrylamide, N-aryl methacrylamide, N-N-diaryl methacrylamide, N-arylalkyl acrylamide, N,N-diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamido methyl propane sulfonic acid, maleic acid and combinations thereof, said copolymer dispersed in an aqueous salt solution.

Still another aspect of this invention is an aqueous dispersion of discrete particles of a water soluble polymer comprising:

a) from about 5 to about 50 weight percent of a water soluble polymer having been prepared by polymerizing under free radical forming conditions at a pH value of from about 5 to about 8:
  i. 1–99 mole percent of a vinylamide monomer of the formula

wherein R, $R^1$ and $R^2$ are each selected from the group consisting of hydrogen, $C_1$–$C_{10}$ alkyl groups, aryl groups and alkylaryl groups; and,
  ii. 99–1 mole percent of at least one vinyl monomer selected from the group consisting of acrylic acid and salts thereof, methacrylamide and salts thereof, $C_1$–$C_{10}$ N-alkyl acrylamide, $C_1$–$C_{10}$ N,N-dialkyl acrylamide, $C_1$–$C_{10}$ N-alkyl methacrylamide, $C_1$–$C_{10}$ N,N-dialkyl methacrylamide, N-aryl acrylamide, N,-N-diaryl acrylamide, N-aryl methacrylamide, N-N-diaryl methacrylamide, N-arylalkyl acrylamide, N,N-diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamido methyl propane sulfonic acid, maleic acid and combinations thereof;

b) from about 0.1 to about 5 weight percent based on the total weight of the dispersion of a water soluble stabilizer polymer having an intrinsic viscosity in 1M $NaNO_3$ of from about 0.1–10 dl/g;

c) from about 5 to about 40 weight percent based on the weight of the dispersion of a water soluble salt selected from the group consisting of ammonium, alkali metal and alkaline earth metal halides, sulfates, phosphates, nitrates and combinations thereof; and d) water, said dispersion being characterized as having a bulk Brookfield viscosity of from about 10 to about 25,000 cps at 25 degrees C.

The invention is also a method for preparing an aqueous dispersion of discrete particles of a water soluble polymer which comprises polymerizing under free radical forming conditions at a pH of from about 5 to about 8:

a) 5–50 weight percent of a mixture containing
  i. 1–99 mole percent of a vinylamide monomer of the formula

wherein R, $R^1$ and $R^2$ are each selected from the group consisting of hydrogen, $C_1$–$C_{20}$ alkyl groups, aryl groups and alkylaryl groups; and,
  ii. 99–1 mole percent of at least one water soluble vinyl monomer selected from the group consisting of vinyl acetate, diallyldimethyl ammonium chloride, vinyl pyrrolidinone, acrylonitrile, dimethylaminoethyl acrylate methyl chloride quaternary salt, dimethylaminoethyl acrylate benzyl chloride quaternary salt, dimethylaminoethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, and combinations thereof; said copolymer dispersed in an aqueous salt solution.

b) from about 0.1 to about 5 weight percent based on the total weight of the dispersion of a water-soluble stabilizer polymer having an intrinsic viscosity in 1M $NaNO_3$ of from about 0.1–10 dl/g;

c) from about 5 to about 40 weight percent based on the total weight of the dispersion of a water soluble salt selected from the group consisting of ammonium, alkali metal and alkaline earth metal halides, sulfates, phosphates, nitrates and combinations thereof; and d) water;

and then recovering a dispersion of said water soluble polymer, said dispersion being characterized as having a viscosity of less than about 25,000 cps at 25 degrees C.

Moreover, the invention is also a method for preparing an aqueous dispersion of discrete particles of a water-soluble non-ionic polymer which comprises polymerizing under free radical forming conditions at a pH of from about 5 to about 8:

a) from about 5 to about 50 weight percent of a water soluble polymer having been prepared by polymerizing under free radical forming conditions at a pH value of from about 5 to about 8, an N-vinylamide monomer of the formula

$H_2C=CR^2NRC(O)R^1$ wherein R, $R^1$ and $R^2$ are each selected from the group consisting of hydrogen, $C_1$–$C_{20}$ alkyl groups, aryl groups and arylalkyl groups;

b) from about 0.1 to about 5 weight percent based on the total weight of the dispersion of a water soluble stabilizer polymer having an intrinsic viscosity in 1M $NaNO_3$ of from about 0.1–10 dl/g;

c) from about 5 to about 40 weight percent based on the weight of the dispersion of a water soluble salt selected from the group consisting of ammonium, alkali metal and alkaline earth metal halides, sulfates, phosphates, nitrates and combinations thereof; and d) water, said dispersion being characterized as having a bulk Brookfield viscosity of from about 10 to about 25,000 cps at 25° C.

The vinylamide monomer in any of the aspects of this invention may be selected from the group consisting of N-vinylformamide, N-methyl-N-vinylacetamide and N-vinyl acetamide.

Another aspect of this invention is a method for preparing an aqueous dispersion of discrete particles of a water-soluble non-ionic polymer which comprises polymerizing under free radical forming conditions at a pH of from about 5 to about 8:

a) 5–50 weight percent of a mixture containing i. 1–99 mole percent of a vinylamide monomer of the formula

$H_2C=CR^2NRC(O)R^1$ wherein R, $R^1$ and $R^2$ are each selected from the group consisting of hydrogen, $C_1$–$C_{20}$ alkyl groups, aryl groups and alkylaryl groups; and, ii. 99–1 mole percent of at least one vinyl monomer selected from the group consisting of acrylic acid and salts thereof, methacrylamide and salts thereof, $C_1$–$C_{10}$ N-alkyl acrylamide, $C_1$–$C_{10}$ N,N-dialkyl acrylamide, $C_1$–$C_{10}$ N-alkyl methacrylamide, $C_1$–$C_{10}$ N,N-dialkyl methacrylamide, N-aryl acrylamide, N,-N-diaryl acrylamide, N-aryl methacrylamide, N-N-diaryl methacrylamide, N-arylalkyl acrylamide, N,N-diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamido methyl propane sulfonic acid, maleic acid and combinations thereof;

b) from about 0.1 to about 5 weight percent based on the total weight of the dispersion of a water soluble stabilizer polymer having an intrinsic viscosity in 1M $NaNO_3$ of from about 0.1–10 dl/g;

c) from about 5 to about 40 weight percent based on the weight of the dispersion of a water soluble salt selected from the group consisting of ammonium, alkali metal and alkaline earth metal halides, sulfates, phosphates, nitrates and combinations thereof; and d) water, said dispersion being characterized as having a bulk Brookfield viscosity of from about 10 to about 25,000 cps at 25 degrees C.

The invention is also a method for in-situ hydrolysis of a dispersion of discrete particles of a water-soluble polymer having pendant amide groups, said polymer dispersed in an aqueous salt solution comprising the steps of:

a) stirring said dispersion;

b) heating said stirred dispersion to a temperature of from about 70° C. to about 90° C.;

c) bubbling HCl gas through said heated dispersion; and, d) recovering a dispersion of discrete particles of a water-soluble polymer having pendant amine groups.

Furthermore, the invention is also a method for in-situ hydrolysis of a dispersion of discrete particles of a copolymer formed by polymerization of a vinylamide monomer of the formula

$H_2C=CR^2NRC(O)R^1$ wherein R, $R^1$ and $R^2$ are each selected from the group consisting of hydrogen, $C_1$–$C_{10}$ alkyl groups, aryl groups and alkylaryl groups; with at least one monomer selected from the group consisting of acrylic acid and salts thereof, methacrylic acid and salts thereof, $C_1$–$C_{10}$ N-alkyl acrylamide, $C_1$–$C_{10}$ N,N-dialkyl acrylamide, $C_1$–$C_{10}$ N-alkyl methacrylamide, $C_1$–$C_{10}$ N,N-dialkyl methacrylamide, N-aryl acrylamide, N,-N-diaryl acrylamide, N-aryl methacrylamide, N-N-diaryl methacrylamide, N-arylalkyl acrylamide, N,N-diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamido methyl propane sulfonic acid, maleic acid and combinations thereof dispersed in an aqueous salt solution comprising the steps of:

a) stirring said dispersion;

b) heating said stirred dispersion to a temperature of from about 70° C. to about 90° C.;

c) bubbling HCl gas through said heated dispersion; and, d) recovering a dispersion of discrete particles of a water-soluble polymer having pendant amine groups.

The invention is also a method for in-situ hydrolysis of a dispersion of discrete particles of a water-soluble non-ionic polymer, said polymer formed by polymerization of an N-vinyl amide monomer of the formula $$H_2C=CR^2NRC(O)R^1$$

wherein R, $R^1$ and $R^2$ are each selected from the group consisting of hydrogen, $C_1$–$C_{20}$ alkyl groups, aryl groups and arylalkyl groups, said polymer dispersed in an aqueous salt solution comprising the steps of:

a) stirring said dispersion;

b) heating said stirred dispersion to a temperature of from about 70° C. to about 90° C.;

c) bubbling HCl gas through said heated dispersion; and, d) recovering a dispersion of discrete particles of a water-soluble cationic poly(vinylamine).

Still another aspect of this invention is a method for in-situ hydrolysis of a dispersion of discrete particles of a water-soluble non-ionic poly(N-vinylformamide) polymer, said polymer dispersed in an aqueous salt solution comprising the steps of:

a) stirring said dispersion;

b) heating said stirred dispersion to a temperature of from about 70° C. to about 90° C.;

c) bubbling HCl gas through said heated dispersion; and, d) recovering a dispersion of discrete particles of a water-soluble cationic poly(vinylamine).

Moreover, the invention is also a method for in-situ hydrolysis of a dispersion of discrete particles of a water-soluble non-ionic poly(N-vinylacetamide) polymer, said polymer dispersed in an aqueous salt solution comprising the steps of:

a) stirring said dispersion;

b) heating said stirred dispersion to a temperature of from about 70° C. to about 90° C.;

c) bubbling HCl gas through said heated dispersion; and, d) recovering a dispersion of discrete particles of a water-soluble cationic poly(vinylamine).

Furthermore, the invention is also a method for clarifying wastewater comprising the step of adding an effective clarifying amount of a water-soluble non-ionic dispersion, said dispersion of discrete particles of a water-soluble, non-ionic poly(N-vinylamide) polymer formed by the polymerization of a vinylamide monomer of the formula $$H_2C=CR^2NRC(O)R^1$$

wherein R, $R^1$ and $R^2$ are each selected from the group consisting of hydrogen, $C_1$–$C_{20}$ alkyl groups, aryl groups and alkylaryl to said waste water.

A method for dewatering waste water comprising the step of adding an effective clarifying amount of a water-soluble non-ionic dispersion, said dispersion of discrete particles of a water-soluble, non-ionic poly(N-vinylamide) polymer formed by the polymerization of a vinylamide monomer of the formula $$H_2C=CR^2NRC(O)R^1$$

wherein R, $R^1$ and $R^2$ are each selected from the group consisting of hydrogen, $C_1$–$C_{20}$ alkyl groups, aryl groups and alkylaryl to said waste water.

In any of the aspects of this invention, the waste water describes industrial waste water, industrial process water and municipal waste water. The industrial waste water includes food processing waste water, oily waste water, paper mill waste water, and mining waste water.

The invention is also a method for clarifying waste water comprising the step of adding an effective clarifying amount of a water-soluble non-ionic dispersion, said dispersion of a copolymer formed by polymerization of a vinylamide monomer of the formula $$H_2C=CR^1 NRC(O)R^1$$

wherein R, $R^1$ and $R^2$ are each selected from the group consisting of hydrogen, $C_1$–$C_{20}$ alkyl groups, aryl groups and alkylaryl groups; with at least one monomer selected from the group consisting of vinyl acetate, diallyldimethyl ammonium chloride, vinyl pyrrolidinone, acrylonitrile, dimethylaminoethyl acrylate methyl chloride quaternary salt, dimethyl amino ethyl acrylate benzyl chloride quaternary salt, dimethylamino ethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, and combinations thereof; said copolymer being dispersed in an aqueous salt solution, to said waste water.

Furthermore, the invention is also a method for dewatering waste water comprising the step of adding an effective clarifying amount of a water-soluble non-ionic dispersion, said dispersion of a copolymer formed by polymerization of a vinylamide monomer of the formula $$H_2C=CR^2NRC(O)R^1$$

wherein R, $R^1$ and $R^2$ are each selected from the group consisting of hydrogen, $C_1$–$C_{20}$ alkyl groups, aryl groups and alkylaryl groups; with at least one monomer selected from the group consisting of vinyl acetate, diallyldimethyl ammonium chloride, vinyl pyrrolidinone, acrylonitrile, dimethylaminoethyl acrylate methyl chloride quaternary salt, dimethylaminoethyl acrylate benzyl chloride quaternary salt, dimethylaminoethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, and combinations thereof; said copolymer being dispersed in an aqueous salt solution, to said waste water.

The invention is also a method of dewatering waste water comprising the step of adding an effective clarifying amount of a water-soluble non-ionic dispersion, said dispersion of a copolymer formed by polymerization of a vinylamide monomer of the formula $$H_2C=CR NRC(O)R^1$$

wherein R, $R^1$ and $R^2$ are each selected from the group consisting of hydrogen, $C_1$–$C_{10}$ alkyl groups, aryl phenyl groups and alkylaryl groups; with at least one monomer selected from the group consisting of acrylic acid and salts thereof, methacrylamide and salts thereof, $C_1$–$C_{10}$ N-alkyl acrylamide, $C_1$–$C_{10}$ N,N-dialkyl acrylamide, $C_1$–$C_{10}$ N-alkyl methacrylamide, $C_1$–$C_{10}$ N,N-dialkyl methacrylamide, N-aryl acrylamide, N,-N-diaryl acrylamide, N-aryl methacrylamide, N-N-diaryl methacrylamide, N-arylalkyl acrylamide, N,N-diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamido methyl propane sulfonic acid, maleic acid and combinations thereof dispersed in an aqueous salt solution, to said waste water.

The present invention is an aqueous dispersion of a water-soluble polymer composition which have good stability and fluidity. The phrase "good stability" is used herein to mean that the aqueous dispersion does not permanently separate into layers during storage. The phrase "good fluidity" is used herein to mean that the aqueous dispersion has a lower viscosity than aqueous solutions of water-soluble polymers of similar concentrations.

The aqueous dispersion of a water-soluble nonionic polymeric composition may be prepared by polymerizing a given amount of a water soluble vinylamide monomer having the formula:

$$CH_2=CHNRC(O)R^1$$

wherein R and $R^1$ are each independently selected from a group consisting of hydrogen and an alkyl group having from 1 to 10 carbon atoms capable of forming a water-soluble polymer in a given amount of an aqueous solution. The nonionic polymeric composition may be a co-polymer containing other monoethylincally unsaturated nonionic monomers. The weight ratio of polymer to the aqueous solution can be adjusted. The resulting product is an aqueous nonionic dispersion having such a form that fine particles containing high molecular weight water soluble nonionic polymer formed from the water soluble vinylamide monomer uniformly dispersed in an aqueous medium. This aqueous dispersion has the property of readily giving a uniform aqueous solution by being diluted with water.

Copolymers of the instant invention polymerized from a first monomer of the formula

$$H_2C=CHNRC(O)R^1$$

with a second monomer to produce copolymers having mole ratios of from 1:99 to 99:1. A preferred molecular weight range for the homo- and co-polymers of this invention is from 500,000 to 5,000,000.

Substituted (meth)acrylamide monomers may be either straight chained or branched alkyl groups. Applicable monomers include, but are not limited to ethyl hexyl (meth) acrylate, diethylaminopropyl (meth)acrylate, dimethylaminohydroxypropyl (meth)acrylamide, N-isopropyl (meth) acrylamide, N-tert-butyl (meth)acrylamide, N,N-dimethylacrylamide (meth)acrylic acid, and N-isopropyl (meth)acrylamide.

As utilized herein, the term arylalkyl is meant to encompass benzyl groups and phenethyl groups. Pendant amine refers to an $NH_2$ group which is attached to the main to polymer chain.

The aqueous dispersion in accordance with the present invention, if required in the form of an aqueous solution resulting from dilution with water, can be advantageously used in a number of technological fields as flocculating agents, thickeners, soil conditioners, adhesives, food additives, dispersants, detergents, additives for medicines or cosmetics, etc.

In most cases, conventional water-soluble polymers are now commercially available in a powder form. The customers dissolve the polymeric powder in an aqueous medium for actual application. The polymer swells in aqueous medium, and the dispersed particles flocculate. It is typically very difficult to dissolve the conventional polymers in an aqueous medium. It is extremely difficult to prepare a uniform concentrated aqueous solution containing the polymers.

Moreover, a polymeric powder is often difficult to handle at a water treatment facility. In spite of these difficulties, the conventional polymeric compositions are typically available in powdered form because conventional polymerization methods being used. In addition to inconvenience of use, the production of polymers in powered form is uneconomical. The recovery of polymers in a powered form from an aqueous solution as obtained by conventional polymerization methods includes the costs associated with the evaporation of a large quantity of water and the drying of polymer.

Additional descriptions of conventional polymerization methods for the production of water-soluble polymers from ethylenically unsaturated monomers are described below.

In accordance with general conventional methods for producing water soluble polymers, a solution polymerization method is carried out using water as the aqueous medium. These methods have an advantage in that the polymerization can be easily accomplished by using an aqueous solution of a monomer in the presence of a polymerization initiator. By these methods, it is easy to obtain polymers having high molecular weights.

However, several problems have been associated with these methods, including:

(1) During the polymerization process, it is difficult to remove or otherwise control the heat of reaction.

(2) Productivity of the method can be difficult to increase as the concentration of the monomer in the aqueous solution is frequently limited.

(3) During the polymerization process, the viscosity of the reaction mixture increases markedly, typically yielding a jelly-like product. The jelly-like polymeric material is difficult to handle, and the process used to procure the polymer as a powder involves the steps of recovery, drying, and pulverization.

In an attempt to avoid these problems, it has been suggested using a precipitation polymerization in which the polymerization would be accomplished in an organic medium which is capable of dissolving the monomer and not the resulting polymer. The resulting polymer would be separated out of solution as a precipitate.

In a water-in-oil suspension polymerization method, a mixture of a monomer and aqueous medium would be dispersed, using a surface active agent, into an organic medium in which both the monomer and the polymer would be sparingly soluble. Polymerization is carried out once the monomer and aqueous medium are dispersed.

However, these methods involve problems as well. For example, the use of an organic medium typically makes it difficult to obtain a polymer having a high molecular weight. Moreover, different apparatus is required for the recovery of the organic medium. The resulting polymer does not readily dissolve in the aqueous medium, tending to form a jelly-like mass. Once such a mass has formed, the aqueous medium cannot easily penetrate the mass, thereby requiring considerable periods of time to dissolve the polymer into the aqueous medium.

In addition to the polymerization method already discussed, another method has been suggested in which a water soluble ethylenically unsaturated monomer is contained in a hydrophobic liquid organic dispersing medium that contains an emulsifier used to form a water-in-oil type emulsion. The monomer is polymerized in the presence of water, thereby forming an oil-in-water type emulsion without separating the polymer. The final product, an oil-in-water emulsion, is used for the actual application.

However, the method requires a large amount of a water-soluble organic solvent whereby secondary pollution by the organic solvent becomes a problem. In addition, a surface active agent is also required to transform the water-in-oil emulsion into the oil-in-water emulsion. The stability of the dispersion is not sufficient, thereby resulting in coagulation during storage or transportation.

The present invention is a process for producing an aqueous dispersion of a water soluble polymer free from the problems of the various conventional methods as described above. According to this process, the polymerization is easily accomplished without increasing viscosity while obtaining a high concentration of polymer in an aqueous dispersion in a stable and highly flowable state.

Using this method, a polymer having a high molecular weight similar to the molecular weight of polymers obtained by the conventional aqueous solution polymerization methods. The polymer obtained by the process of the present invention can be easily diluted with water to form a uniform aqueous solution of polymer without the difficulties associated with polymers in a powder form. The resulting aqueous solution can be used as a flocculating agent and other uses discussed herein.

In one embodiment of the present invention is that a relatively large amount of the ethylenically unsaturated monomer (a water soluble vinylamide) is polymerized in an aqueous solution. According to the present invention, an increase in viscosity does not occur during the polymerization process. The resulting product has good stability and fluidity in spite of a relatively high polymer concentration. Moreover the resulting aqueous dispersion can be easily diluted with water to a uniform aqueous solution.

When, according to the present invention, the water-soluble ethylenically unsaturated monomer (a water soluble vinylamide) is polymerized in the aqueous solution, the resulting water-soluble ethylenic polymer forms a loose water-containing complex without being dissolved in water. Phase separation occurs between the complex and the aqueous phase to form microscopic particles, thereby producing a low viscosity aqueous dispersion.

The resulting polymer forms as microscopically sized globules which disperse in the aqueous solution, thereby forming a low-viscosity aqueous dispersion. When a sufficient amount of water is added to the resulting aqueous dispersion, the state of phase separation can be easily destroyed to form a uniform aqueous solution.

The polymerization reaction simply proceeds by the application of heat. In addition, a radical initiator, ultraviolet light, or radial rays may be used in the polymerization process. In performing the present invention, it is especially preferred to use a water soluble radical initiator such as hydrogen peroxide, potassium persulfate and ammonium persulfate, or a so-called redox system composed of such a water-soluble radical initiator and a reducing agent such as an amine or sodium bisulfite.

The initiator is typically used in an amount ranging from about 0.005 to about 10% by weight based on the weight of the ethylenically unsaturated monomer (a water soluble vinylamide). The entire amount of the initiator may be added at the beginning of the polymerization process, or a portion of the initiator may be added at the beginning of the polymerization process with the remaining portion being added during the course of the polymerization process.

The polymer initiator is preferably selected from the group consisting of 2,2,-azobis(2-amidinopropane) hydrochloride (V-50), 2,2,-azobis(N,N'-dimethylene isobutylamide) dihydrochloride (V-044), ammonium persulfate (APS), ammonium persulfate/sodium meta bisulfite (APS/SBS), and ferric/ascorbic acid. The initiator is typically present in an amount between about 400 to 6,000 ppm based on the monomers used.

The chain transfer agent is preferably selected from the group consisting of benzyl alcohol, isopropyl alcohol, tertiary amines, sodium bisulfite and sodium formate. The chain transfer agent is typically present in an amount between about 5 to about 2,000 ppm based on the monomers.

The polymerization reaction temperature generally ranges from about 10° to about 100° C., more preferably from about 40° to about 70° C. The reaction is performed so that the polymerization of the vinylamide monomer is substantially completed. Substantial completion means that the conversion is at least 80%. The time required for this reaction generally ranges from about 3 to about 10 hours. The polymerization can be performed on a batchwise or on a continuous basis.

The polymerization process can be effected in a pH range of from 5–8. A preferred pH range for polymerization is 6–7.5.

In preparing the aqueous polymer dispersion in accordance with the present invention, inorganic salts soluble in water may be required. Examples of inorganic salts that may be used in the present invention include: chlorides, nitrates, sulfates and phosphates of metals and ammonia. Typical examples of these inorganic salts are sodium chloride, calcium chloride, calcium nitrate, sodium nitrate, ammonium nitrate, potassium sulfate, calcium phosphate, aluminum nitrate, and ferric sulfate.

These inorganic salts may be used singly or as a mixture of two or more salts. The amount of the inorganic salt to be used in the present invention depends on the amount of the inorganic salt which uniformly dissolves in water. The entire amount of the inorganic salt may be added at the beginning of the polymerization process, or portions of the inorganic salt may be added intermittently at any time during the polymerization process. The inorganic salt may also be added after the polymerization process has ended. As used herein, the term phosphates includes, but is not limited to sodium phosphate and sodium hydrogen phosphate. Preferred salts are sodium nitrate, sodium chloride and ammonium sulfate. If ammonium sulfate is the salt, it should be added only after, and not during the polymerization.

Addition of the inorganic salts is helpful to some extent for improving the stability and flowability of the resultant aqueous dispersion. This is presumably because the inorganic salt takes up moisture from the resulting polymer particles to compact and stabilize the individual polymer particles.

The salt aqueous solutions are generally at a concentration of 15% or more, preferably 20% by weight or more. The salt is typically present during the reaction in an amount between about 16.5 to about 18 weight % based on batch size. At the end of the reaction more salt, typically in an amount between about 0.5 to about 5.0 weight %, is added. The amount of salt in the final reaction product is in the range between about 18.0 to about 22.5% by weight of the final product.

The novel homo- and co-polymers are also compatible with conventional stabilizers such as poly (dimethylaminoethylacrylate methyl chloride quaternary salt). When poly(vinyl alcohol) is the stabilizer polymer, it is preferably to have the polymer of as high a molecular weight and as hydrolyzed as possible. Herein, Mowiol, a poly(vinyl alcohol) polymer available from Aldrich Chemical Co., 88% hydrolyzed and with a molecular weight of approximately 125,00 to 135,000 was utilized. Though the degree of hydrolysis may vary, a preferred range of hydrolysis is 70–80%. A preferred molecular weight range for the poly(vinyl alcohol) is from 100,000 to 200,000.

The in-situ hydrolysis described herein normally hydrolyzes up to 70% of the amide groups to free amine pendant groups. To achieve a 100% hydrolysis, base must be utilized. Hydrolysis can be effected either by bubbling in HCl gas, or by adding an HCl solution dropwise to the dispersion, with stirring at a temperature of from 70° C. to 90° C.

Conventional processes for the preparation of a water soluble cationic polymer useful as a flocculant include polymerization in an aqueous solution, water-in-oil emulsion polymerization, and suspension polymerization in a hydrophobic solvent. U.S. Pat. No. 4,929,655 (Takeda et al.), which issued on May 29, 1990, and the disclosure of which is incorporated herein by reference, provided a novel process for preparing a water soluble polymer dispersion which overcomes the many disadvantages of the stationary polymerization, water-in-oil type emulsion polymerization and suspension polymerization processes.

Conventional processes for the preparation of a water soluble cationic polymer useful as a flocculent include polymerization in an aqueous solution, water-in-oil emulsion polymerization, and suspension polymerization in a hydrophobic solvent. U.S. Pat. No. 4,929,655 (Takeda et al.), which issued on May 29, 1990, and the disclosure of which is incorporated herein by reference, provided a novel process for preparing a water soluble polymer dispersion which overcomes the many disadvantages of the stationary polymerization, water-in-oil type emulsion polymerization and suspension polymerization processes.

These dispersions have utility for a wide range of applications. As utilized herein, the term industrial process water is meant to encompass water utilized during the papermaking process. These dispersions also have utility as flocculants in systems such as municipal waste waters, paper mills, chemical processing plants, refineries, and food processing plants among others.

The following examples are presented to describe preferred embodiments and utilities of the invention and are not meant to limit the invention unless otherwise stated in the claims appended hereto.

EXAMPLE 1

To make a poly(N-vinylformamide) homopolymer dispersion, the following procedure was utilized. To a reaction kettle equipped with a reflux condensor, $N_2$ dispersion tube, star paddle and turbine and thermocouple, was added N-vinylformamide monomer (available from Air Products & Chemicals Company, 75 g), poly(vinylalcohol) (10% solution, 40 g), water (250 g) glycerol (6 g) and $NaNO_3$ (120 g). The solution was stirred and heated to 45° C. The initiator, V-50 (available from DuPont Chemical Company) was added to one portion (0.2 g 20 ml $H_2O$). As the reaction proceeds, there is an increase in viscosity. A total of 125 g of NaCl was added in portions throughout the reaction. The total reaction time is roughly 3–3.5 hours. The milky-white dispersion is then stored for further use.

EXAMPLE 2

To synthesize a poly(N-vinylformamide/ethyl hexylacrylate) copolymer dispersion, the following procedure was utilized. To a reaction kettle equipped with a reflux condensor, $N_2$ dispersion tube, star paddle and turbine and thermocouple, was added N-vinylformamide monomer (available from Air Products & Chemicals Company, 54 g), ethylhexylacrylate (available from Aldrich Chemical Company, 3.0 g), polyvinylalcohol (10% solution, 30 g), water (150 g), glycerol (45 g) and $NaNO_3$, (40 g) $Na_2SO_4$, NaCl (25 g). The solution was stirred and heated to 45° C. The initiator, V-50 (available from DuPont Chemical Company) was added in one portion (0.3 g 20 ml $H_2O$).

As the reaction proceeds, there is an increase in viscosity. A total of 100 g of $(NH_4)_2SO_4$ was added in portions through the reaction. 200 g of water was also added to the reaction mixture. The total reaction time is roughly 3–3.5 hours. The milky-white dispersion is then stored for further use. The mole ratio of NVF/ethyl hexylacrylate is from about 99/1 to about 90/10.

EXAMPLE 3

To hydrolyze the dispersion polymer, the following procedure was utilized. The dispersion polymer was placed in a round bottom flask and enough water was added to make a 2% solution. A molar equivalent of NaOH was added and the mixture was heated to 80–90° C. for 3 hours. Greater than 90% of the amide groups hydrolyzed to amine groups. A molar equivalent of acid can be used as the hydrolyzing agent. Acid hydrolysis yielded copolymers containing a ratio of amine to amide of 70/30.

EXAMPLE 4

To hydrolyze a dispersion polymer, the following alternative procedure could be utilized. The first alternative is a hydrolysis utilizing HCl gas. In a three necked flask equipped with a reflux condenser, paddle stirrer, thermocouple and gas dispersion tube, a 100 g sample of a polyvinylformamide dispersion (15% active, 0.21 moles) is heated to 50° C. Gaseous HCl (8.0 g, 0.21 moles) is then bubbled into the dispersion over 10 minutes. The reaction mixture is then stirred at 50° C. for 2 hours. The resulting copolymer contained roughly 70% amine hydrochloride and 30% amide. The amount of acid can be varied to achieve different amine/amide ratios.

In the second alternative, gaseous ammonia is utilized to effect the hydrolysis in the following fashion. In a three necked flask equipped with a reflux condensor, paddle stirrer, thermocouple and gas dispersion tube, a 300 g sample of a polyvinylformamide dispersion (15% active, 0.62 moles) is heated to 50° C. Gaseous ammonia (10.6 g, 0.62 moles) is then bubbled into the dispersion over 10 minutes. The reaction mixture is then stirred at 70° C. for 3 hours. The resulting polymer should contain $\geq 95\%$ amine. As with the acid, the amount of base can be varied to achieve different amine/amide ratios.

Changes can be made in the composition, operation and arrangement of the method of the present invention described herein without departing from the concept and scope of the invention as defined in the following claims:

What is claimed is:
1. A method for preparing an aqueous dispersion of discrete particles of a water soluble polymer comprising polymerizing in an aqueous solution of anionic salt in the presence of a water-soluble stabilizer polymer under free radical forming conditions at a pH of from about 5 to about 8:
   a) 5–50 weight percent of a mixture containing
      i. 1–99 mole percent of a vinylamide monomer of formula

$H_2C=CR^2NRC(O)R^1$ wherein R, $R^1$ and $R^2$ are independently selected from hydrogen, $C_1$–$C_{20}$ alkyl groups, aryl groups and alkylaryl groups; and, ii. 99–1 mole percent of at least one water soluble vinyl monomer selected from vinyl acetate, diallyldimethyl ammonium chloride, vinyl pyrrolidinone, acrylonitrile, dimethylaminoethylacrylate methyl chloride quaternary salt, dimethylaminoethylacrylate benzyl chloride quaternary salt, dimethylaminoethylacrylate methyl sulfate quaternary salt, dimethylaminoethylacrylate cetyl chloride quaternary salt, dimethylaminoethylmethacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, wherein the stabilizer polymer has an intrinsic viscosity in 1M $NaNO_3$ of from about 0.1–10 dl/g and comprises from about 0.1 to about 5 weight percent based on the total weight of the dispersion, the water soluble salt is selected from ammonium, alkali metal and alkaline earth metal halides, sulfates, phosphates, nitrates and combinations thereof and comprises from about 5 to about 40 weight percent based on the total weight of the dispersion and the dispersion has a viscosity of less than about 25,000 cps at 25° C., wherein the stabilizer polymer is selected from the group consisting of poly(vinyl alcohol), partially hydrolyzed poly(vinyl acetate), hydrolyzed poly(vinyl acetate/N-vinyl formamide), poly(vinyl alcohol/acrylamide), poly(diallyldimethyl ammonium chloride), poly(dimethylaminoethyl acrylate methyl chloride quaternary salt), poly(dimethylaminoethyl methacrylate methyl chloride quaternary salt), poly(dimethylaminoethyl acrylate benzyl chloride quaternary salt), poly(dimethylaminoethyl methacrylate benzyl chloride quaternary salt), poly(diallyldimethyl ammonium chloride/dimethyaminoethyl acrylate methyl chloride quaternary salt), poly(diallyldimethylammonium chloride/dimethylaminoethyl methacrylate methyl chloride quaternary salt), poly(diallyldimethylammonium chloride/dimethylaminoethyl acrylate benzyl chloride quaternary salt), and poly(diallyldimethyl ammonium chloride/dimethylaminoethyl methacrylate benzyl chloride quaternary salt) and combinations thereof.

2. A method for preparing an aqueous dispersion of discrete particles of a water soluble polymer comprising polymerizing in an aqueous solution of an anionic salt in the presence of a water-soluble stabilizer polymer under free radical forming conditions at a pH of from about 5 to about 8:

an N-vinylamide monomer of the formula $H_2C=CR^2NRC(O)R^1$ wherein R, $R^1$ and $R^2$ are independently selected from hydrogen, $C_1$–$C_{20}$ alkyl groups, aryl groups and arylalkyl groups, wherein the stabilizer polymer has an intrinsic viscosity in 1M $NaNO_3$ of from about 0.1–10 dl/g and comprises from about 0.1 to about 5 weight percent based on the total weight of the dispersion, the water soluble salt is selected from ammonium, alkali metal and alkaline earth metal halides, sulfates, phosphates, nitrates and combinations thereof and comprises from about 5 to about 40 weight percent based on the total weight of the dispersion and the dispersion has a viscosity of from about 10 to about 25,000 cps at 25° C. wherein the stabilizer polymer is selected from the group consisting of poly(vinyl alcohol), partially hydrolyzed poly(vinyl acetate), hydrolyzed poly(vinyl acetate/N-vinyl formamide), poly(vinyl alcohol/acrylamide), poly(diallyldimethyl ammonium chloride), poly(dimethylaminoethyl acrylate methyl chloride quaternary salt), poly(dimethylaminoethyl methacrylate methyl chloride quaternary salt), poly(dimethylaminoethyl acrylate benzyl chloride quaternary salt), poly(dimethylaminoethyl methacrylate benzyl chloride quaternary salt), poly(diallyldimethyl ammonium chloride/dimethyaminoethyl acrylate methyl chloride quaternary salt), poly(diallyldimethylammonium chloride/dimethylaminoethyl methacrylate methyl chloride quaternary salt), poly(diallyldimethylammonium chloride/dimethylaminoethyl acrylate benzyl chloride quaternary salt), and poly(diallyldimethyl ammonium chloride/dimethylaminoethyl methacrylate benzyl chloride quaternary salt) and combinations thereof.

3. A method for preparing an aqueous dispersion of discrete particles of a water soluble polymer comprising polymerizing in an aqueous solution of an anionic salt in the presence of water-soluble stabilizer polymer under free radical forming conditions at a pH of from about 5 to about 8:

a) 5–50 weight percent of a mixture containing
i. 1–99 mole percent of a vinylamide monomer of formula $H_2C=CR^2NRC(O)R^1$ wherein R, $R^1$ and $R^2$ are independently selected from hydrogen, $C_1$–$C_{20}$ alkyl groups, aryl groups and alkylaryl groups; and ii. 99–1 mole percent of at least one vinyl monomer selected from the group consisting of acrylic acid and salts thereof, methacrylamide and salts thereof, $C_1$–$C_{10}$ N-alkyl acrylamide, $C_1$–$C_{10}$ N,N-dialkyl acrylamide, $C_1$–$C_{10}$ N-alkyl methacrylamide, $C_1$–$C_{10}$ N,N-dialkyl methacrylamide, N-aryl acrylamide, N,-N-diaryl acrylamide, N-aryl methacrylamide, N-N-diaryl methacrylamide, N-arylalkyl acrylamide, N,N-diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamido methyl propane sulfonic acid, maleic acid and combinations thereof;

wherein the stabilizer polymer has an intrinsic viscosity in 1M $NaNO_3$ of from about 0.1–10 dl/g and comprises from about 0.1 to about 5 weight percent based on the total weight of the dispersion, the water soluble salt is selected from ammonium, alkali metal and alkaline earth metal halides, sulfates, phosphates, nitrates and combinations thereof and comprises from about 5 to about 40 weight percent based on the total weight of the dispersion and the dispersion has a viscosity of from about 10 to about 25,000 cps at 25° C., wherein the stabilizer polymer is selected from the group consisting of poly(vinyl alcohol), partially hydrolyzed poly(vinyl acetate), hydrolyzed poly(vinyl acetate/N-vinyl formamide), poly(vinyl alcohol/acrylamide), poly(diallyldimethyl ammonium chloride), poly(dimethylaminoethyl acrylate methyl chloride quaternary salt), poly(dimethylaminoethyl methacrylate methyl chloride quaternary salt), poly(dimethylaminoethyl acrylate benzyl chloride quaternary salt), poly(dimethylaminoethyl methacrylate benzyl chloride quaternary salt), poly(diallyldimethyl ammonium chloride/dimethyaminoethyl acrylate methyl chloride quaternary salt), poly(diallyldimethylammonium chloride/dimethylaminoethyl methacrylate methyl chloride quaternary salt), poly(diallyldimethylammonium chloride/dimethylaminoethyl acrylate benzyl chloride quaternary salt), and poly(diallyldimethyl ammonium chloride/dimethylaminoethyl methacrylate benzyl chloride quaternary salt) and combinations thereof.

4. The method of claim 2 wherein said vinylamide monomer is selected from the group consisting of N-vinylformamide, N-methyl-N-vinylacetamide and N-vinyl acetamide.

5. The method of claim 1 wherein the stabilizer polymer is polyvinyl alcohol and the water soluble salt is sodium nitrate.

6. The method of claim 2 wherein the stabilizer polymer is polyvinyl alcohol and the water soluble salt is sodium nitrate.

7. The method of claim 3 wherein the stabilizer polymer is polyvinyl alcohol and the water soluble salt is sodium nitrate.

\* \* \* \* \*